US012561513B2

(12) United States Patent
Wang et al.

(10) Patent No.: US 12,561,513 B2
(45) Date of Patent: Feb. 24, 2026

(54) READING TYPESETTING METHOD, APPARATUS, DEVICE AND STORAGE MEDIUM

(71) Applicant: Beijing Bytedance Network Technology Co., Ltd., Beijing (CN)

(72) Inventors: Zitao Wang, Beijing (CN); Dongyu Chen, Beijing (CN)

(73) Assignee: Beijing Bytedance Network Technology Co., Ltd., Beijing (CN)

( * ) Notice: Subject to any disclaimer, the term of this patent is extended or adjusted under 35 U.S.C. 154(b) by 260 days.

(21) Appl. No.: 18/567,649

(22) PCT Filed: Dec. 12, 2022

(86) PCT No.: PCT/CN2022/138368
§ 371 (c)(1),
(2) Date: Dec. 6, 2023

(87) PCT Pub. No.: WO2023/124936
PCT Pub. Date: Jul. 6, 2023

(65) Prior Publication Data
US 2024/0273280 A1    Aug. 15, 2024

(30) Foreign Application Priority Data

Dec. 31, 2021    (CN) .......................... 202111665308.4

(51) Int. Cl.
*G06F 40/109*      (2020.01)
*G06F 40/114*      (2020.01)

(52) U.S. Cl.
CPC .......... *G06F 40/109* (2020.01); *G06F 40/114* (2020.01)

(58) Field of Classification Search
CPC .................................................. G06F 40/109
(Continued)

(56) References Cited

U.S. PATENT DOCUMENTS 6,898,601 B2 * 5/2005 Amado ................. G06F 40/166
                           715/251
7,447,992 B2 * 11/2008 Kawabata ............. G06F 40/103
                           715/251
(Continued)

FOREIGN PATENT DOCUMENTS

CN      106713962 A    5/2017
CN      109299440 A   *   2/2019      G06F 40/117
(Continued)

OTHER PUBLICATIONS

International Search Report issued Mar. 1, 2023 for PCT Application No. PCT/CN2022/138368, English translation (2 pages).

*Primary Examiner* — Reza Nabi

(57) ABSTRACT

The present disclosure relates to reading typesetting method, apparatus, device and storage medium, the method comprising: receiving an instruction for push information processing; determining a first typesetting mode of a currently read page based on the instruction for push information processing; wherein the first typesetting mode is used for keeping reading information of the currently read page and determining a first display area and a second display area on the currently read page; re-typesetting the currently read page based on the first typesetting mode, and displaying target push information and at least a part of currently read content in the first display area and the second display area on the re-typeset currently read page respectively; wherein the target push information is obtained by processing original push information based on a processing mode corresponding to the instruction for push information processing.

18 Claims, 7 Drawing Sheets

(58) Field of Classification Search
USPC ........................................................ 715/251
See application file for complete search history.

(56) References Cited

U.S. PATENT DOCUMENTS

| | | | | | |
|---|---|---|---|---|---|
| 8,719,701 | B2 * | 5/2014 | Mansfield | ............. | G06F 40/126 |
| | | | | | 715/251 |
| 10,417,667 | B1 * | 9/2019 | Agostino | ........... | G06Q 30/0269 |
| 2011/0258043 | A1 * | 10/2011 | Ailaney | ............. | G06Q 30/0241 |
| | | | | | 715/251 |
| 2013/0100167 | A1 * | 4/2013 | Bose | ..................... | G06F 1/1626 |
| | | | | | 345/651 |
| 2013/0227383 | A1 * | 8/2013 | Kim | ...................... | G06F 16/487 |
| | | | | | 715/201 |
| 2013/0232407 | A1 * | 9/2013 | Onuma | ................. | G06F 40/114 |
| | | | | | 715/251 |
| 2014/0115432 | A1 * | 4/2014 | Turner | ................. | G06F 40/114 |
| | | | | | 715/251 |
| 2014/0285455 | A1 * | 9/2014 | Jiang | ....................... | G06F 3/017 |
| | | | | | 345/173 |
| 2015/0121204 | A1 * | 4/2015 | O'Donoghue | ........ | G06F 40/114 |
| | | | | | 715/251 |
| 2015/0309680 | A1 * | 10/2015 | Higuchi | ................ | G06F 40/106 |
| | | | | | 715/201 |
| 2016/0179349 | A1 * | 6/2016 | Ishikawa | .............. | G06F 40/166 |
| | | | | | 715/202 |
| 2016/0188558 | A1 * | 6/2016 | Shikawa | ............... | G06F 40/103 |
| | | | | | 715/230 |
| 2018/0107638 | A1 * | 4/2018 | Ekambaram | .......... | G06F 3/0481 |
| 2019/0227823 | A1 * | 7/2019 | Xiao | ...................... | G06F 40/279 |
| 2020/0175945 | A1 * | 6/2020 | Chen | ........................ | G09G 5/14 |
| 2020/0228617 | A1 * | 7/2020 | Guo | ...................... | H04L 67/562 |
| 2020/0304863 | A1 * | 9/2020 | Domm | ................. | H04N 21/472 |
| 2023/0229382 | A1 * | 7/2023 | Zhang | .................... | G11B 27/10 |
| 2024/0273280 | A1 * | 8/2024 | Wang | .................... | G06F 16/957 |

FOREIGN PATENT DOCUMENTS

| | | |
|---|---|---|
| CN | 109597981 A | 4/2019 |
| CN | 111241805 A | 6/2020 |
| CN | 111597780 A | 8/2020 |
| CN | 111915348 A | 11/2020 |
| CN | 112069116 A | 12/2020 |
| CN | 114330277 A | 4/2022 |
| WO | 2013185808 A1 | 12/2013 |
| WO | 2017157067 A1 | 9/2017 |

* cited by examiner

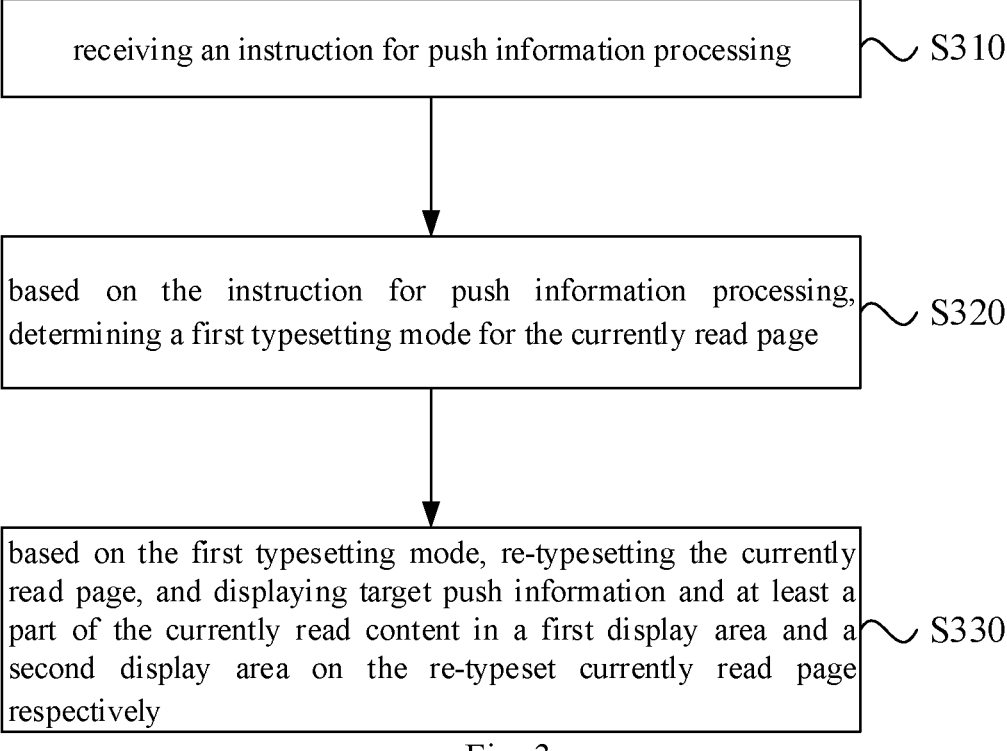

receiving an instruction for push information processing ~ S310 based on the instruction for push information processing, determining a first typesetting mode for the currently read page ~ S320 based on the first typesetting mode, re-typesetting the currently read page, and displaying target push information and at least a part of the currently read content in a first display area and a second display area on the re-typeset currently read page respectively ~ S330

Fig. 3

READING TYPESETTING METHOD, APPARATUS, DEVICE AND STORAGE MEDIUM

The present application is based on and claims priority from the application having the Chinese application number 202111665308.4 filed on Dec. 31, 2021, the disclosure of which is incorporated herein in its entirety.

TECHNICAL FIELD

The present disclosure relates to the technical field of information processing, and in particular, to reading typesetting method, apparatus, device, and storage medium.

BACKGROUND

With popularization of electronic products and development of the computer technology, more and more users read electronic books through electronic devices. During display process of an electronic book, some information (such as advertisements) is sometimes pushed to a user for the user to view. There are various ways to insert and display push information into an electronic book, one of which is to insert and display the push information in a bottom area (e.g. a bottom banner control) in a left-right page turning mode.

SUMMARY OF THE INVENTION

Some embodiments of the disclosure provide reading typesetting method, apparatus, device and storage medium.

In a first aspect, the present disclosure provides a reading typesetting method, comprising:

receiving an instruction for push information processing;

determining a first typesetting mode of currently read page based on the instruction for push information processing, wherein the first typesetting mode is used for keeping reading information of the currently read page, and determining a first display area and a second display area on the currently read page; and re-typesetting the currently read page based on the first typesetting mode, and displaying target push information and at least a part of the currently read content in the first display area and the second display area on the re-typeset currently read page respectively, wherein the target push information is obtained by processing original push information based on a processing mode corresponding to the instruction for push information processing.

In a second aspect, the present disclosure provides a reading typesetting apparatus, comprising:

an instruction receiving module configured to receive an instruction for push information processing;

a first typesetting mode determining module configured to determine a first typesetting mode of currently read page based on the instruction for push information processing, wherein the first typesetting mode is used for keeping reading information of the currently read page and determining a first display area and a second display area on the currently read page; and a typesetting module configured to re-typeset the currently read page based on the first typesetting mode, and display target push information and at least a part of currently read content in the first display area and the second display area of the re-typeset currently read page respectively; wherein the target push information is obtained by processing original push information based on a processing mode corresponding to the instruction for push information processing.

In a third aspect, the present disclosure provides an electronic device, comprising:

a processor; and a memory for storing executable instructions;

wherein the processor is used for reading the executable instructions from the memory and executing the executable instructions to perform the reading typesetting method of the first aspect.

In a fourth aspect, the present disclosure provides a computer-readable storage medium storing a computer program which, when executed by a processor, causes the processor to perform the reading typesetting method of the first aspect.

DESCRIPTION OF THE DRAWINGS

The above and other features, advantages, and aspects of embodiments of the present disclosure will become more apparent by referring to the drawings and the following embodiments. Throughout the drawings, the same or similar reference signs represent the same or similar elements. It should be understood that the drawings are schematic and that elements and components are not necessarily drawn to scale.

FIG. 3 is a schematic flow chart illustrating a reading typesetting method provided by an embodiment of the disclosure;

DETAILED DESCRIPTION

Figure 1:
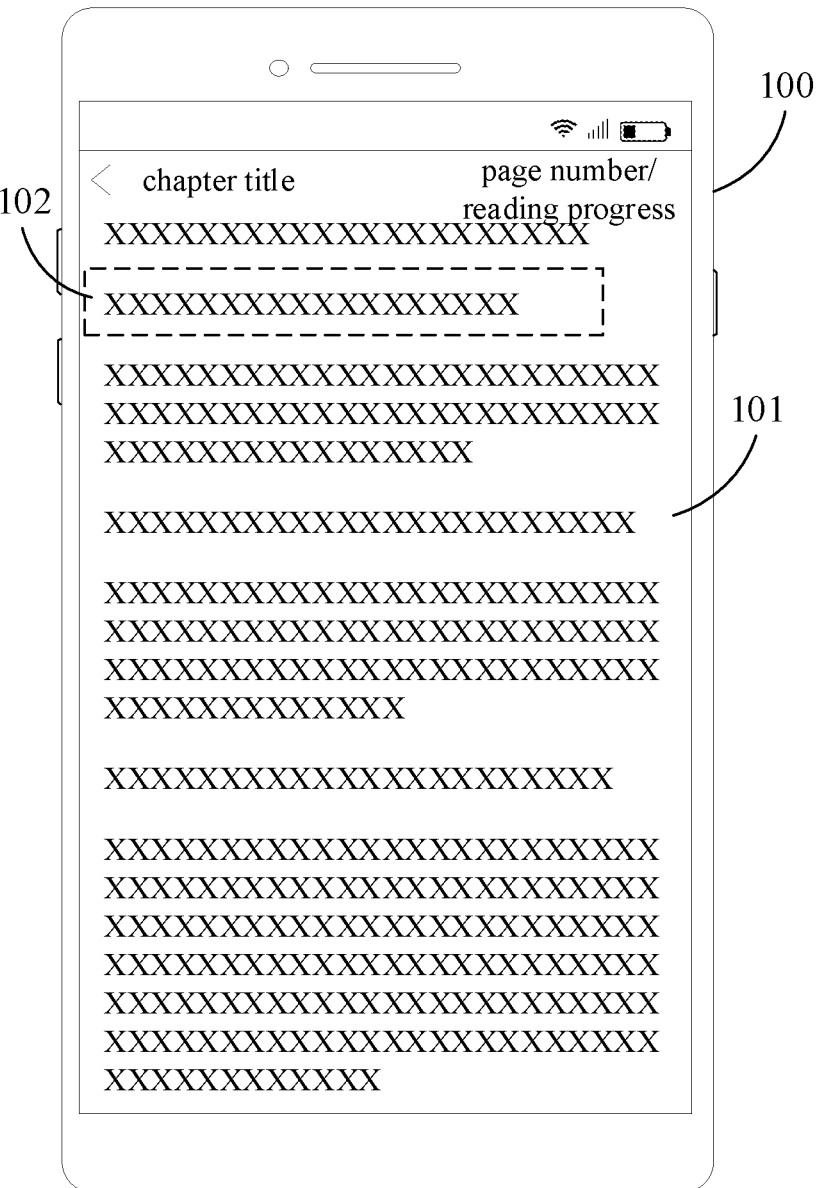
FIG. 1 is a schematic diagram illustrating a currently read page in the related art.

Embodiments of the present disclosure will be described in more detail below with reference to the accompanying drawings. While certain embodiments of the present disclosure are shown in the drawings, it should be understood that the present disclosure may be embodied in various forms and should not be construed as being limited to the embodiments set forth herein, but rather, these embodiments are provided for a more complete and thorough understanding of the present disclosure. It should be understood that the drawings and the embodiments of the disclosure are for illustration purposes only and are not intended to limit the scope of the disclosure.

It should be understood that the various steps recited in method embodiments of the present disclosure may be performed in a different order, and/or performed in parallel. Moreover, method embodiments may include additional steps and/or omit performing the illustrated steps. The scope of the present disclosure is not limited in this regard.

The term "comprising" and the variations thereof as used herein are intended to be open-ended, i.e., "comprising but not limited to". The term "based on" means "based at least in part on". The term "one embodiment" means "at least one embodiment"; the term "another embodiment" means "at least another embodiment"; the term "some embodiments" means "at least some embodiments". Relevant definitions for other terms will be given in the following description.

It should be noted that the terms "first", "second" and the like in the present disclosure are only used for distinguishing different means, modules or units, and are not used for limiting the order or interdependence of the functions performed by the means, modules or units.

It is noted that references to "a" and "multiple" in this disclosure are intended to be illustrative rather than limiting, and that those skilled in the art will appreciate that they shall be understood as "one or more" unless the context clearly indicates otherwise.

The names of messages or information exchanged between devices in the embodiments of the present disclosure are for illustrative purposes only, and are not intended to limit the scope of the messages or information.

With popularization of electronic products and development of the computer technology, more and more users read electronic books through electronic devices. During display process of an electronic book, some information (such as advertisements) is sometimes pushed to a user for the user to view. There are various ways to insert and display push information into an electronic book, one of which is to insert and display the push information in a bottom area (e.g. a bottom banner control) in a left-right page turning mode.

At present, main implementations for the above approach include: after receiving an instruction for push information insertion, re-typesetting, by the electronic device, the entire chapter in units of chapters according to a typesetting mode of firstly dividing lines and then dividing pages, and skipping to a paragraph position which is being read by the user after the typesetting is finished. In the related art, in a case where the electronic device inserts push information or closes push information in a bottom area of the read page in the left-right page turning mode, it is generally done by re-typesetting the whole chapter.

However, in the above implementation scheme, since push information needs to be inserted into the bottom area of the read page, displayable book content on each read page is reduced, such that the position of the read content on each read page after re-typesetting is changed dramatically, which makes it difficult for the user to locate the position where he/she is reading during the reading process, thereby reducing the reading efficiency of the user.

In order to solve said technical problem, the present disclosure provides a reading typesetting method, apparatus, device and storage medium.

As shown in FIG. 1, an electronic device 100 displays an electronic book in a typesetting manner in which the contents of the book are displayed in full screen, and a currently read line 102 that the user is reading is typeset in a second line of a currently read page 101. When the electronic device receives an instruction of inserting push information in a bottom area, it vacates the bottom area on each reading page for displaying the push information, re-pages and re-typesets the whole read chapter according to remaining areas except the bottom area, and then jumps to a page related to read content on the currently read page 101 before the re-typesetting and displays the content, and the display effect can be seen in FIG. 2.

Figure 2:
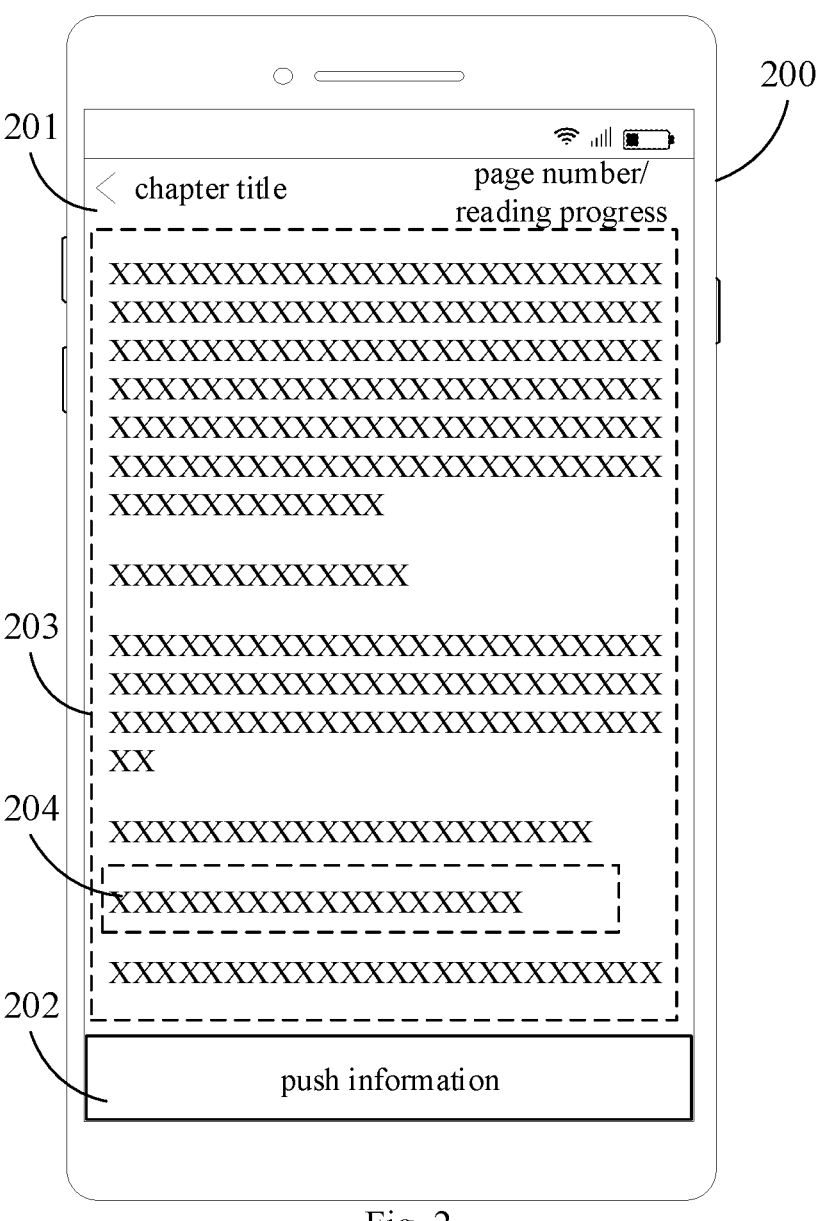
FIG. 2 is a schematic diagram illustrating another currently read page in the related art.

As shown in FIG. 2, an electronic device 200 redisplays a currently read page 201, displays push information in a bottom area 202 of the currently read page 201, and displays read content in a remaining area 203 of the currently read page 201. Due to reduction in the remaining area and re-paging and re-typesetting, a currently read line 204 that the user is reading is displayed in a penultimate line of the currently read page 201. Therefore, it is not easy for the user to quickly position where he/she is reading, thereby decreasing the reading efficiency of the user, and moreover, such a process would greatly interfere with the user's reading, so that the user would be easily annoyed by the inserted push information, resulting in a reduced click rate of the push information.

Based on the above situation, embodiments of the present disclosure provide a reading typesetting scheme, according to which in a left-right page turning mode, when push information in a certain area of a read page is inserted or closed, the currently read page is dynamically typeset by a first typesetting mode as determined such that while the push information is correctly processed, reading information on the currently read page is kept as much as possible, thereby reducing perception of the user during processing of the push information, increasing speed of positioning currently read content by the user, and further increasing the user's reading efficiency and click rate of the push information.

In an embodiment of the present disclosure, the reading typesetting method may be performed by a reading typesetting apparatus, which may be implemented by software and/or hardware, and the apparatus may be integrated in an electronic device with a display function. The electronic device may include, but is not limited to, a smartphone, PDA (personal digital assistant), PAD (tablet), laptop, desktop, etc.

FIG. 3 shows a flow chart illustrating a reading typesetting method provided by an embodiment of the disclosure. As shown in FIG. 3, the reading typesetting method may comprise the following steps:

S310, receiving an instruction for push information processing.

The push information refers to information pushed to a user for viewing, which may include, for example, advertisements of various contents, function introduction related to electronic books, reading activity information related to electronic books, and the like. The instruction for push information processing is an instruction for processing push information, which may include, for example, an instruction for push information insertion to instruct inserting of push information into a read page, or an instruction for push information closing to instruct closing of push information displayed on a read page. In one example, the instruction for push information processing is an instruction for each read page of the electronic book, i.e., a response to the instruction for push information processing is required in each read page. In another example, the instruction for push information processing is an instruction for some specified read pages of the electronic book, i.e., a response to the instruction for push information processing is required only in the specified read pages.

Specifically, the electronic device monitors an event which can trigger an instruction for push information processing during the user's reading of an electronic book.

In an example, the electronic device monitors various instructions issued by a server, and receives an instruction for push information processing issued by the serving end until the instruction for push information processing is monitored. For example, the electronic device receives an instruction for push information insertion or an instruction for push information closing issued by the serving end.

In another example, the electronic device detects a function control related to push information displayed by the electronic device, and may obtain an instruction for push information processing until a trigger operation by the user on the function control is detected. For example, the electronic device detects a close button corresponding to displayed push information, and obtains an instruction for push information closing upon detection of a trigger operation by the user. In another example, the electronic device detects a button for starting the information push function, and obtains an instruction for push information insertion upon detection of a trigger operation by the user.

In some embodiments, in a scenario where the instruction for push information processing is an instruction for some specified read pages, after receiving the instruction for push information processing, the electronic device may determine whether to perform push information processing on the currently read page based on the instruction for push information processing. That is, the electronic device parses the instruction for push information processing to obtain the specified read pages therein. Then, the electronic device determines whether the currently displayed read page (i.e., the currently read page) matches the specified read page. If a result of the determination is not matching, this typesetting process ends, and an instruction for pushed information processing is monitored continuously or the specified read page and the currently read page which changes along with the user's reading are matched continuously until the match is successful. If a result of the determination is matching, it means the currently read page needs to process the push information in response to the instruction for push information processing, and subsequent steps would be performed.

S320, determining a first typesetting mode of the currently read page based on the instruction for push information processing.

The first typesetting mode refers to a mode of re-typesetting a currently read page. In an embodiment of the disclosure, the first typesetting mode is used for keeping reading information of the currently read page and determining a first display area and a second display area on the currently read page. The reading information here refers to information related to reading, such as read content, read page number, top line content, top line position, and the like. The first display area and the second display area refer to two different display areas on the read page.

Specifically, the electronic device parses the instruction for push information processing, obtains a processing mode of the push information therefrom, and determines a first typesetting mode of the currently read page according to the processing mode. The first typesetting mode needs to keep the reading information of the currently read page as constant as possible so as to ensure that the interference degree on the reading process of the user is as low as possible. Moreover, the first typesetting manner further needs to determine the first display area and the second display area on the currently read page according to the parsed processing mode. The area positions and the area sizes of the first display area and the second display area can be determined according to the push information and the processing mode thereof.

In some embodiments, the first typesetting mode may be a preset adjustment mode to adjust line spacing, word spacing, word size, and the like on the currently read page, so as to keep the reading content of the currently read page unchanged.

In other embodiments, the first typesetting mode may be to keep the original typesetting modes such as reading content, paragraph, line spacing, word spacing, word size, and the like of the currently read page unchanged, and perform re-typesetting in response to an instruction for pushed information processing after the currently read page is turned over.

In still other embodiments, the first typesetting mode may be to appropriately delete from or add to currently read contents displayed on the currently read page according to the determined processing mode, so as to respond to the instruction for push information processing under the condition that most of the read contents on the currently read page and the original typesetting mode thereof are kept unchanged.

S330, re-typesetting the currently read page based on the first typesetting mode, and displaying target push information and at least a part of the currently read content in the first display area and the second display area on the re-typeset currently read page, respectively.

The target push information is obtained by processing the original push information based on the processing mode corresponding to an instruction for push information processing. The original push information as used here is push information issued by a serving end. When the processing mode corresponding to the instruction for push information processing is to insert push information, the original push information may be directly determined as target push information; when the processing mode corresponding to the instruction for push information processing is to close push information, the push information does not need to be displayed, and then the target push information can be determined to be empty information.

Specifically, the electronic device re-typesets the currently read page according to the first typesetting mode. Most of the contents in the currently read contents are reserved on the currently read page after the re-typesetting, and the contents are displayed in the second display area. The first display area and the target push information displayed therein differ depending on the processing mode. For example, when the processing mode is to insert the push information, the first display area on the re-typeset currently read page is a display area preset for displaying the push information, and the original push information is displayed therein; when the processing mode is to close the push information, the re-typeset currently read page does not include the first display area, i.e., the area size of the first display area is 0, and the target push information is empty information, i.e., the original push information is not displayed.

According to the reading typesetting method provided by the embodiment of the disclosure, after an instruction for push information processing is received, a first typesetting mode for keeping the reading information on the currently read page is determined according to the instruction for push information processing, the currently read page is re-typeset according to the first typesetting mode, and target push information and at least a part of the currently read content are respectively displayed in the first display area and the second display area on the re-typeset currently read page. This enables dynamic typesetting of the currently read page and displaying of target push information adaptive to the instruction for push information processing on a currently read page while keeping read information including at least a part of the currently read content on the currently read page unchanged, solves the problem of overlarge typesetting change of the read content on the currently read page caused by re-typesetting of the whole chapter due to processing of push information, reduces the typesetting change degree of the currently read page, and thus reduces interference to the user during his/her reading, such that the user can quickly position the content being read, thereby increasing the user's reading efficiency and improving the user's reading experience.

In some embodiments, according to the above description, in a case where the instruction for push information processing comprises an instruction for push information insertion, the target push information is the original push information. Then, said step S320 may be performed as the following step A and step B.

Step A, determining a first display area on the currently read page based on a push information inserting position corresponding to the instruction for push information insertion, and determining other display areas except the first display area on the currently read page as a second display area.

The push information inserting position refers to a position on the read page where the push information is displayed, which may be a position carried in the instruction for push information insertion or a predetermined position in the electronic device.

Specifically, the electronic device determines a push information inserting position according to the instruction for push information insertion; for example, it determines that the push information inserting position is an area position such as the bottom, the top, or the side of the read page. Then, the electronic equipment determines a first display area on the currently read page according to the determined push information inserting position. For example, when the push information inserting position is the bottom of the read page, the first display area is determined according to the size of the predetermined bottom banner control. Then, the electronic device determines other display areas except the first display area on the currently read page as a second display area.

Step B, determining displaying of the original push information and at least a part of the currently read content respectively in the first display area and the second display area as a typesetting position and a typesetting content in the first typesetting mode.

Specifically, according to the above description on the first typesetting mode, the first display area is used for displaying the original push information, and the second display area is used for displaying the read content determined in the first typesetting mode. The read content may be most of the currently read content, or may be the complete currently read content, or may be the currently read content and part of the subsequently read content subsequent thereto. Thus, the typesetting position in the first typesetting mode and the typesetting content that needs to be displayed in each typesetting position can be determined. The content typesetting style/display style of the typesetting content can be determined by properly adjusting the original typesetting style on the currently read page according to the area size of the second display area and the number of the typeset contents.

In an example, respectively displaying of the original push information and the currently read content in the first display area and the second display area are determined as a typesetting position and a typesetting content in the first typesetting mode; and the first preset adjustment mode is determined as a content typesetting style in the first typesetting mode.

The first preset adjustment mode is a preset mode for carrying out compact adjustment on the content typesetting style. Illustratively, the first preset adjustment mode includes reducing at least one of line spacing, wording spacing and word size.

Specifically, in this example, immediately after receiving the instruction for push information insertion, the electronic device triggers re-typesetting of the currently read page, that is, the typesetting triggering condition for the first typesetting mode is receiving an instruction for push information insertion. In order to maintain the read content on the currently read page and avoid the problem that a user needs to turn pages to locate the content being read, the typesetting positions determined in the first typesetting mode are respectively the first display area and the second display area, and the determined typesetting contents are respectively the original push information displayed in the first display area and the complete currently read content displayed in the second display area.

Because the second display area is smaller than the full-screen display area of the currently read page, the typesetting style of the currently read content needs to be adjusted while the currently read content is kept unchanged, i.e., in the first preset adjustment mode, the original typesetting style of the currently read content is adjusted in a compact manner according to the area size of the second display area.

For example, a line spacing may be re-determined according to the area size of the second display area and the number of lines in which the currently read contents are arranged, where the re-determined line spacing is smaller than the line spacing in the original typesetting style, and the currently read content on the currently read page is re-typeset using the re-determined line spacing.

Figure 4:
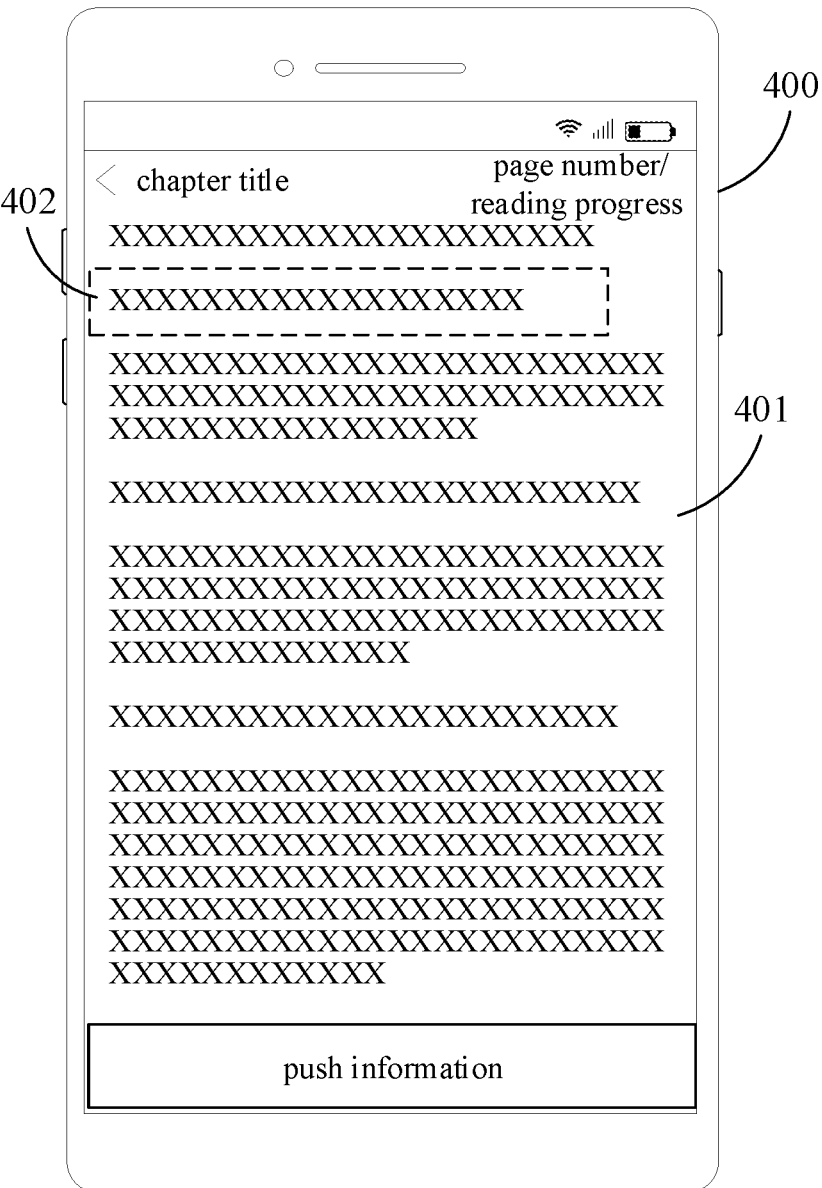
FIG. 4 is a schematic diagram illustrating display of a currently read page according an embodiment of the present disclosure.

Taking the currently read page shown in FIG. 1 as an example, the re-typeset currently read page obtained by reducing the line spacing is as shown in FIG. 4. As shown in FIG. 4, a re-typeset currently read page 401 is displayed in the electronic device 400. Since only the line spacing is reduced, display content and the display position of each line on the re-typeset currently read page 401 remain unchanged, so that the currently read line 402 being read by the user is still displayed on the second line. This would enable the user to quickly position the content being read with small perception degree, while guaranteeing inserting and displaying push information, thereby reducing interference of the insertion of the push information on the reading by the user and increasing the user's reading efficiency.

In another example, the typesetting line number of the currently read content may be reduced by reducing the word spacing or the word size in the original typesetting style according to an area size of the second display area while maintaining the line spacing of the original typesetting style, so that the re-typeset currently read content may be completely displayed in the second display area.

In another example, the line spacing, word spacing and word size in the original typesetting style may be reduced simultaneously according to the area size of the second display area so as to re-typeset the currently read content. Because the adjustment is carried out in a plurality of dimensions, a relatively small adjustment can be carried out in each dimension, so that the degree of change in the original typesetting style is reduced to a certain extent on the basis that all the currently read contents are displayed in the second display area, thereby reducing the perception degree of the user on the change of the typesetting style, and increasing the speed of the user for positioning the reading.

In a further example, a page turning operation on the currently read page is determined as a typesetting triggering condition in the first typesetting mode; respectively displaying the original push information and the currently read content in the first display area and the second display area are determined as a typesetting position and a typesetting content in the first typesetting mode; and the first preset adjustment mode is determined as a content typesetting style in the first typesetting mode.

Specifically, in order to make the user completely imperceptible, the typesetting trigger condition may be determined as a page turning operation on the currently read page. In this way, when the electronic device does not detect a page turning operation by the user on the currently read page, the original typesetting style of the currently read page is kept completely unchanged, and push information is not inserted into and displayed on the currently read page. Only when the electronic device detects a page turning operation by the user on the currently read page, it re-typesets the currently read page before the page turning and inserts and displays the pushed information. The typesetting positions of the re-typesetting are a first display area and a second display area, respectively, and the typesetting contents are the original push information displayed in the first display area and the complete currently read contents displayed in the second display area, respectively, and the content typesetting style is a first preset adjustment mode.

Figure 5:
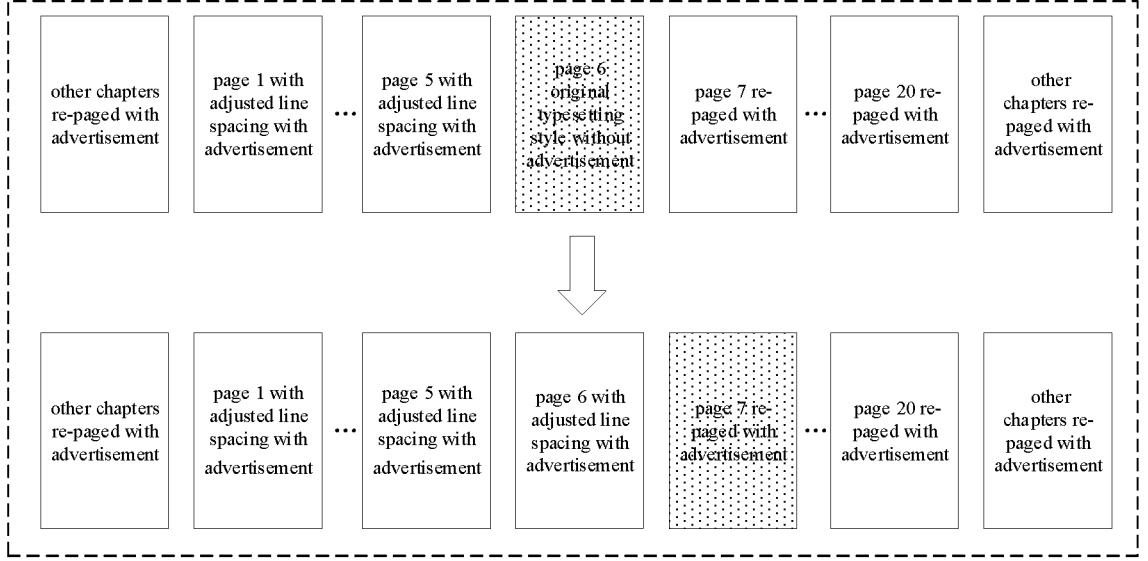
FIG. 5 is a schematic diagram illustrating display of a plurality of read pages according to an embodiment of the disclosure.

Referring to FIG. 5, during the user's reading of page 6 as the currently read page (e.g., in dot filling), the electronic device receives an instruction for push information insertion, and at this time, the electronic device does not re-typeset the currently read page, that is, the original typesetting style of the currently read page is kept unchanged. Upon detection of a page turning operation by the user, the electronic device may determine page 7 as the currently read page. At this time, the electronic device re-typesets the currently read page before page turning, i.e., page 6, according to a first preset adjustment mode with reduced line spacing, and displays advertisements in the first display area on the re-typeset page 6.

In yet another example, the first typesetting mode is to delete a part of the read contents on the currently read page and keep the original typesetting style of the remaining currently read contents. In other words, if it is determined that the first display area covers a first part of read content on the currently read page, the first part of read content is removed from the currently read content to update the currently read content, and the first part of read content is merged into subsequently read content succeeding the currently read content; displaying of the original push information and the updated currently read content in the first display area and the second display area are determined as a typesetting position and a typesetting content in the first typesetting mode.

Specifically, in this example, the trigger condition of the first typesetting mode is to receive an instruction for push information insertion. After determining a first display area in response to an instruction for push information insertion, the electronic device may determine whether the first display area covers at least a part of the currently read content. For example, when the first display area is a bottom area, it may be determined whether content in the currently read content is displayed in the area range where the first display area is located. If it is determined there is no such content in this area, the push information can be directly displayed without re-typesetting the currently read page. If it is determined there is such content in this area, read content covered by the first display area (i.e. the first part of read content) can be determined according to the coverage range of the first display area. Then, the electronic device deletes the first part of read content from the currently read content to reduce the read content to be displayed on the currently read page, and merges the first part of read content into the read content succeeding the currently read content (i.e. the subsequently read content) to maintain the integrity of content of the electronic book. Then, the electronic device may display the original push information in the first display area of the currently read page and display the updated currently read content in the second display area according to the original typesetting style. In this way, under the condition that line being currently read by the user is not the first part of the read content, the inserted push information can be displayed and the original typesetting mode of the updated currently read content can be kept unchanged, thereby achieving an effect of inserting push information without perception of the user.

Figure 6:
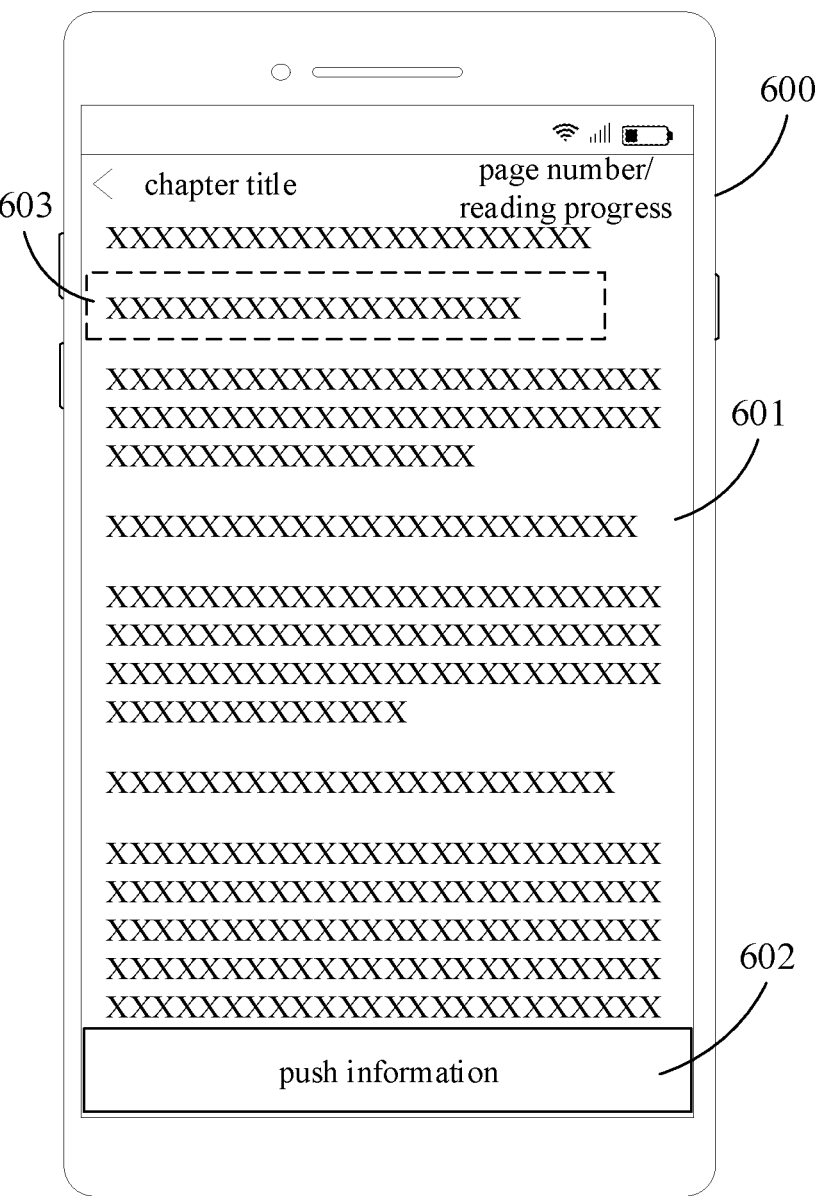
FIG. 6 is a schematic diagram illustrating display of another currently read page according to an embodiment of the disclosure.

Re-typesetting the currently read page as shown in FIG. 1 in said first typesetting mode would result in a re-typeset currently read page, and the display effect thereof is shown in FIG. 6. A re-typeset currently read page 601 is displayed in the electronic device 600. Push information 602 is displayed at the bottom of the currently read page 601, and a currently read line 603 being read by the user is still displayed in the second line, except that the last paragraph on the currently read page 601 is changed from 7 lines as shown in FIG. 1 to 5 lines, with the remaining 2 lines of content being displayed on a subsequently read page.

In further embodiments, according to the above description, in a case where the instruction for push information processing includes an instruction for push information closing, the target push information is empty information. Then, said step S320 may be performed as the following step C and step D.

Step C, determining a first display area on the currently read page based on display information of the original push information corresponding to the instruction for push information closing, deleting the first display area, and determining the full-screen display area on the currently read page as a second display area.

The display information refers to relevant information, such as a display position, a display size, a display style and the like, when the original push information is displayed.

Specifically, upon receiving the instruction for push information closing, the electronic device may determine a first display area on the currently read page according to display information of the original push information to be closed as indicated by the instruction for push information closing. For example, the first display area is determined according to the display position and the display size of the original push information. Because empty information will be displayed in the first display area after the push information is closed, which causes waste of reading space in the electronic device, the electronic device removes the first display area from the currently read page and determines the full-screen display area as a second display area.

Step D, determining at least displaying the currently read content in the second display area as a typesetting position and a typesetting content in the first typesetting mode.

Specifically, the currently read page only includes a second display area, and the content to be displayed only has read content, so the typesetting position of the first typesetting mode is the second display area, and the typesetting content of the first typesetting mode is at least the currently read content.

By removing the first display area and determining the second display area, the problem of reading space waste caused by fixing the first display area on the read page can be solved, thereby increasing a data amount of read content displayed on the read page and further increasing the user's reading efficiency.

In an example, the first typesetting mode is to keep the original typesetting style of the currently read content, extract the read content (i.e., a second part of the read content) that can be accommodated in the coverage area of the first display area from the subsequently read content, and merge the second part of the read content into the currently read content, as the typesetting content. In other words, the electronic device extracts, in sequence, the second part of read content from the subsequently read content succeeding the currently read content based on the display information, and merges the second part of read content with the currently read content to update the currently read content; and determines displaying of the updated currently read content in the second display area as the typesetting position and the typesetting content in the first typesetting mode.

Specifically, upon receiving the instruction for push information closing, the electronic device closes the original push information displayed on the currently read page, so that a white space exists in the second display area. In order to increase the display efficiency of the read content, the electronic device may determine, according to the display information and the original typesetting style when the original push information is displayed, a typesetting line number that can be additionally displayed on the currently read page. Then, the electronic device extracts the read content of the determined typesetting line number needing to be added from the subsequently read content according to the sequence of the read content as a second part of read content. And the electronic device merges the second part of read content into the currently read content so as to update the currently read content. Then, in order to reduce the user perception in the process of closing the push information so that the user can quickly position his/her reading and continue with the reading, the electronic device keeps the original typesetting style of the currently read content, i.e., the updated currently read content is re-typeset using the original typesetting style and displayed in the second display area. The effect of this process is changed from FIG. 6 to FIG. 1.

On the basis of the above example, the displaying the target push information and at least a part of the currently read content in the first display area and the second display area on the re-typeset currently read page respectively comprises: displaying the currently read content in a second display area in the re-typeset currently read page, and displaying a second part of the read content at a preset transparency change rate succeeding the currently read content.

The preset transparency change rate is a preset change rate with respect to a transparency of a viewing object.

Specifically, in order to further reduce the user perception in the process of closing the push information, the display style of the second part of the read content may be set to be a gradient style. For example, a gradient display style with a preset transparency change rate may be added to the second part of the read content, so that the second part of the read content is gradually displayed; in another example, a new viewing object may be overlaid on the second part of the read content, and the display style of the viewing object is set to gradually change from opaque to transparent according to the preset transparency change rate, so that the second part of the read content is gradually displayed.

In another example, the displaying the currently read content in the second display area is determined as the typesetting position and the typesetting content in the first typesetting mode; and the second preset adjustment mode is determined as the content typesetting style in the first typesetting mode.

The second preset adjustment mode is a preset mode for performing expansion adjustment on the content typesetting style. Illustratively, the second preset adjustment mode includes increasing at least one of a line spacing, a word spacing and a word size.

Specifically, the currently read content is kept unchanged in this example. Then, in order to avoid a white space of the first display area appearing in the second display area, the electronic device may adjust the currently read content according to a second preset adjustment mode, so that the currently read content is entirely displayed in the second display area.

For example, a line spacing may be re-determined according to the area size of the second display area and the arrangement line number of the currently read content, where the re-determined line spacing is greater than the line spacing in the original typesetting style, and the currently read content in the currently read page may be re-typeset using the re-determined line spacing. The display effect of this process is changed from FIG. 4 to FIG. 1.

In another example, the typesetting line number of the currently read content may be increased by enlarging the word spacing or the word size in the original typesetting style according to the area size of the second display area while maintaining the line spacing of the original typesetting style, so that the re-typeset currently read content is entirely displayed in the second display area.

In another example, the line spacing, word spacing and word size in the original typesetting style may be simultaneously enlarged according to the area size of the second display area to re-typeset the currently read content. In this way, relatively small adjustment can be performed in each dimension, so that the degree of change in the original typesetting style is reduced to a certain extent on the basis that the currently read content is entirely displayed in the second display area, thereby reducing the perception degree of the user on the change of the typesetting style, and increasing the speed of positioning the content being read by the user.

In yet another example, the page turning operation on the currently read page is determined as a typesetting triggering condition in the first typesetting mode; displaying the currently read content in the second display area is determined as a typesetting position and a typesetting content in the first typesetting mode; and the second preset adjustment mode is determined as a content typesetting style in the first typesetting mode.

Specifically, in a case where an instruction for push information closing to close the original push information is issued backstage, the original push information on the currently read page may be closed with a delay. In this way, in order to make the user completely imperceptible, the typesetting trigger condition may be determined as a page turning operation on the currently read page. Therefore, when the electronic device does not detect a page turning operation of the user on the currently read page, the original typesetting style of the currently read page is kept completely unchanged, and the original push information is still displayed on the currently read page. When the electronic device detects a page turning operation of the user on the currently read page, the electronic device re-typesets the currently read page before the page turning and closes the original push information. The typesetting position of the re-typesetting is a second display area, the typesetting content is the complete currently read content displayed in the second display area, and the content typesetting style is a second preset adjustment mode.

In some embodiments, after receiving the instruction for push information processing, the reading typesetting method further comprises a typesetting process for each subsequently read page succeeding the currently read page. The subsequently read page may be a read page corresponding to the chapter (i.e., the currently read chapter) of the currently read content, i.e., only the currently read chapter is re-typeset each time. The method is applicable to a condition that an instruction opposite to an instruction for push information processing is received when the subsequently read chapter is started, and a condition that a part of chapters are preset to display the push information. In this way, the process of re-typesetting the subsequently read chapters succeeding the currently read chapter can be reduced, avoiding repeated re-typesetting. The subsequently read page may also be a read page in the currently read chapter and the subsequently read chapter, namely, the electronic book is re-typeset each time, so that re-typesetting of all subsequent unread contents can be completed at one time, thereby avoiding the problem of display delay of the read page due to re-typesetting each time a chapter is started.

In this embodiment, the electronic device determines, based on an instruction for push information processing, a second typesetting mode for a subsequently read page subsequent to the currently read page, and performs re-typesetting on the subsequently read page based on the second typesetting mode to generate a re-typeset subsequently read page.

Specifically, the typesetting position of the second typesetting mode determined by the electronic device includes a third display area and a fourth display area determined based on the instruction for push information processing. The area information of the third display area and the fourth display area is consistent with the area information of the first display area and the second display area, respectively, and thus, the process of determining the third display area and the fourth display area can be known with reference to the process of determining the first display area and the second display area.

The typesetting content of the second typesetting mode determined by the electronic device comprises target push information displayed in the third display area and single-page subsequently read content displayed in the fourth display area, wherein the single-page subsequently read content is read content obtained by re-paging the subsequently read content succeeding the currently read content. That is, the target push information is displayed in the third display area of the subsequently read page, the single-page subsequently read content is displayed in the fourth display area, and the single-page subsequently read content is obtained by re-paging the subsequently read content according to the original typesetting style of the currently read page and the area size of the fourth display area.

For example, where the instruction for push information processing is an instruction for push information insertion, a result of said process is as shown in FIG. 5. For each of the subsequently read pages succeeding page 6 as the currently read page, and read pages of the other reading chapters preceding and succeeding the currently read chapter, the advertisement is displayed in the third display area, and the single-page subsequently read content obtained by re-paging is displayed in the fourth display area.

In some embodiments, after receiving the instruction for push information processing, the reading typesetting method further comprises a process of re-typesetting respective read pages preceding the currently read page (namely, previously read pages) in the currently read chapter. That is, the electronic device determines a third typesetting mode of a previously read page preceding the currently read page, and re-typesets the previously read page based on the third typesetting mode to generate a re-typeset previously read page.

Specifically, since each previously read page is content that the user has already read, in order to increase the speed of positioning content the user wants to read, a basic principle for determining the third typesetting mode in the embodiment of the present disclosure is to leave both the read content displayed on the previously read page (i.e., the previously read content) and the page number as is.

Based on the above situation, the typesetting position of the third typesetting mode determined by the electronic device includes a fifth display area and a sixth display area determined based on the instruction for push information processing. The area information of the fifth display area and the sixth display area is consistent with the area information of the first display area and the second display area, respectively. Thus, the process of determining the fifth display area and the sixth display area can be known with reference to the process of determining the first display area and the second display area.

The typesetting content of the third typesetting mode determined by the electronic device comprises target push information displayed in the fifth display area and previously read content displayed in the sixth display area. That is, the target push information is still displayed in the fifth display area, and the previously read content on the previously read page is displayed in the sixth display area.

Like the read content displayed in the second display area, due to a change of the area size of the sixth display area, the content typesetting style of the previously read content needs to be adjusted, and the adjustment mode is specifically a third preset adjustment mode. The third preset adjustment mode differs due to differences in the instruction for push information processing. If the instruction for push information processing is an instruction for push information insertion, the third preset adjustment mode is a compact adjustment mode, namely, the first preset adjustment mode; if the instruction for push information processing is an instruction for push information closing, the third preset adjustment mode is an expansion type adjustment mode, namely, the second preset adjustment mode. As for the process of adjusting the previously read content according to the third preset adjustment mode, reference may be made to the related contents in the above embodiments.

For example, when the instruction for push information process is an instruction for push information insertion, a result of the above process is as shown in FIG. 5. For each previously read page preceding page 6 as the currently read page, the advertisement is displayed in the fifth display area, and previously read content obtained by reducing the line spacing is displayed in the sixth display area.

Through description of the above embodiments, the reading typesetting method according to the embodiments of the present disclosure may include dynamically typesetting the whole electronic book in different ways by splitting electronic book into a currently read page, previously read pages, and subsequently read pages, in response to the instruction for push information processing, which can avoid both a problem of reading space waste caused by fixing the area for displaying the original push information and a problem of excessively large changes in the read content and the read position caused by the complete re-paging and re-typesetting of chapters, thereby improving the speed of locating the content read by the user and the display efficiency of the read content, further improving the reading efficiency and the reading experience of the user, and also improving the click rate of the push information to a certain extent.

Figure 7:
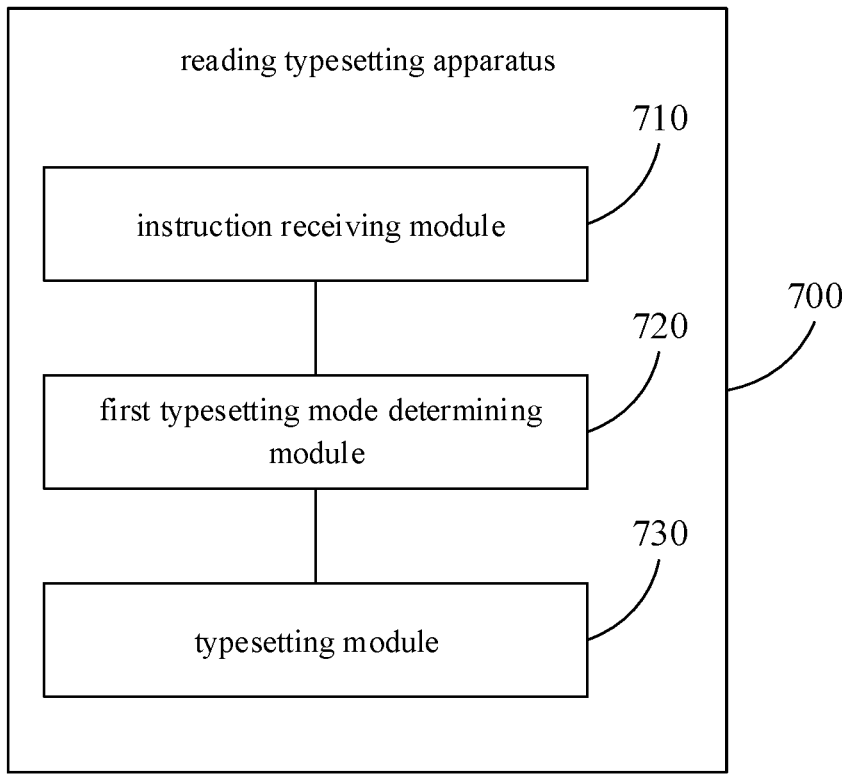
FIG. 7 is a schematic structural diagram illustrating a reading typesetting apparatus provided by an embodiment of the disclosure.

FIG. 7 shows a schematic structural diagram of a reading typesetting apparatus provided by an embodiment of the disclosure. As shown in FIG. 7, the reading typesetting apparatus 700 may comprise:

an instruction receiving module 710, configured to receive an instruction for push information processing;

a first typesetting mode determining module 720, configured to determine a first typesetting mode for the currently read page based on the instruction for push information processing; wherein the first typesetting mode is used for keeping read information of the currently read page and determining a first display area and a second display area on the currently read page; and a typesetting module 730, configured to re-typeset the currently read page based on the first typesetting mode, and display target push information and at least a part of the currently read content in the first display area and the second display area on the re-typeset currently read page respectively; wherein the target push information is obtained by processing the original push information based on a processing mode corresponding to the instruction for push information processing, and the currently read content is read content displayed on the currently read page.

The reading typesetting apparatus provided by the embodiment of the disclosure can determine, after receiving the instruction for push information processing, a first typesetting mode for keeping the read information of the currently read page according to the instruction for push information processing, re-typeset the currently read page according to the first typesetting mode, and display the target push information and at least a part of the currently read content in the first display area and the second display area on the re-typeset currently read page respectively. This enables dynamic typesetting of the currently read page, and at the same time, target push information adaptive to the instruction for push information processing is displayed on the currently read page while read information such as at least a part of the currently read content on the currently read page is kept unchanged, and this solves the problem of overlarge typesetting change of the read content on the currently read page caused by re-typesetting of the whole chapter due to processing of the push information, thereby reducing the typesetting change degree of the currently read page, reducing interference to the user in the reading process, such that the user can quickly position the content he/she is reading, and thus improving the reading efficiency and the reading experience of the user.

In some embodiments, in a case where the instruction for push information processing includes an instruction for push information insertion, the target push information is an original push information;

accordingly, the first typesetting mode determining module 720 includes:

a first display area determining submodule, configured to determine a first display area on the currently read page based on a push information insertion position corresponding to the instruction for push information insertion, and determine other display areas other than the first display area on the currently read page as a second display area; and a first typesetting content determining submodule, configured to determine respectively displaying original push information and at least a part of the currently read content in the first display area and the second display area as a typesetting position and a typesetting content in the first typesetting mode.

In some embodiments, the typesetting content determining submodule is specifically configured to:

determine respectively displaying the original push information and the currently read content in the first display area and the second display area as the typesetting position and the typesetting content in the first typesetting mode;

accordingly, the first typesetting mode determining module 720 further includes a first content typesetting style determining submodule, configured to:

determine the first preset adjustment mode as a content typesetting style in the first typesetting mode; wherein the first preset adjustment mode comprises reducing at least one of line spacing, word spacing and word size of the currently read content based on the area size of the second display area.

Further, the first typesetting mode determining module 720 further includes a first typesetting triggering condition determining module, configured to:

determine the page turning operation on the currently read page as a typesetting triggering condition in the first typesetting mode.

In some embodiments, the typesetting content determining submodule is specifically configured to:

remove a first part of read content from the currently read content, if it is determined the first display area covers the first part of read content of the currently read content, so as to update the currently read content, and merge the first part of read content into subsequently read content succeeding the currently read content; and determine respectively displaying the original push information and the updated currently read content in the first display area and the second display area as the typesetting position and the typesetting content in the first typesetting mode.

In some embodiments, in a case that the instruction for push information processing includes an instruction for push information closing, the target push information is empty information;

accordingly, the first typesetting mode determining module 720 includes:

a second display area determining submodule, configured to determine a first display area on the currently read page based on display information of the original push information corresponding to the instruction for push information closing, delete the first display area and determine the full-screen display area on the currently read page as a second display area; and a second typesetting content determining submodule, configured to determine at least displaying the currently read content in the second display area as a typesetting position and a typesetting content in the first typesetting mode.

In some embodiments, the second typesetting content determining submodule is specifically configured to:

based on the display information, sequentially extract a second part of read content from the subsequently read content succeeding the currently read content, and merge the second part of read content with the currently read content to update the currently read content; and determine displaying the updated currently read content in the second display area as a typesetting position and a typesetting content in the first typesetting mode.

Further, the typesetting module 730 is specifically configured to:

display the currently read content in a second display area on the re-typeset currently read page, and display a second part of the read content at a preset transparency change rate succeeding the currently read content.

In some embodiments, the second typesetting content determining submodule is specifically configured to:

determine displaying the currently read content in the second display area as a typesetting position and a typesetting content in the first typesetting mode;

accordingly, the first typesetting mode determining module 720 further includes a second content typesetting mode determining submodule, configured to:

determine the second preset adjustment mode as a content typesetting style in the first typesetting mode; wherein the second preset adjustment mode comprises increasing at least one of line spacing, word spacing and word size of the currently read content based on the area size of the second display area.

Further, the first typesetting mode determining module 720 further includes a second typesetting triggering condition determining module, configured to:

determine the page turning operation on the currently read page as a typesetting triggering condition in the first typesetting mode.

In some embodiments, the reading typesetting apparatus 700 further comprises a subsequently read page typesetting module, configured to:

after receiving the instruction for push information processing, determine a second typesetting mode of a subsequently read page succeeding the currently read page based on the instruction for push information processing, and re-typeset the subsequently read page based on the second typesetting mode to generate a re-typeset subsequently read page;

wherein the typesetting position of the second typesetting mode comprises a third display area and a fourth display area which are determined based on the instruction for push information processing;

the typesetting content of the second typesetting mode comprises target push information displayed in the third display area and single-page subsequently read content displayed in the fourth display area; the single-page subsequently read content is read content obtained by re-paging the subsequently read content succeeding the currently read content.

In some embodiments, the reading typesetting apparatus 700 further comprises a previously read page typesetting module, configured to:

after receiving the instruction for push information processing, determine a third typesetting mode of a previously read page preceding the currently read page, and re-typeset the previously read page based on the third typesetting mode to generate a re-typeset previously read page;

wherein the typesetting position of the third typesetting mode comprises a fifth display area and a sixth display area which are determined based on the instruction for push information processing;

the typesetting content of the third typesetting mode comprises target push information displayed in the fifth display area and previously read content displayed in the sixth display area; previously read content is read content displayed on the previously read page;

the content typesetting style in the third typesetting mode is a third preset adjustment mode; the third preset adjustment mode is an adjustment mode to adjust at least one of line spacing, word spacing and word size of the previously read content according to the adjustment mode corresponding to the instruction for push information processing based on the area size of the sixth display area.

In some embodiments, the reading typesetting apparatus 700 further comprises a typesetting triggering module, configured to:

after receiving the instruction for push information processing, determine whether to carry out push information processing on the currently read page based on the instruction for push information processing;

if so, triggers the execution of a step of determining a first typesetting mode of the currently read page based on the instruction for push information processing.

It should be noted that the reading typesetting apparatus 700 shown in FIG. 7 may perform the respective steps in the method embodiments shown in FIGS. 1 to 6, and implement the processes and effects in the method embodiments shown in FIGS. 1 to 6, which are not described here.

Embodiments of the present disclosure also provide an electronic device that may comprise a processor and a memory that may be used to store executable instructions. The processor may be configured to read the executable instructions from the memory and execute the executable instructions to implement the reading typesetting method in the foregoing embodiments.

Figure 8:
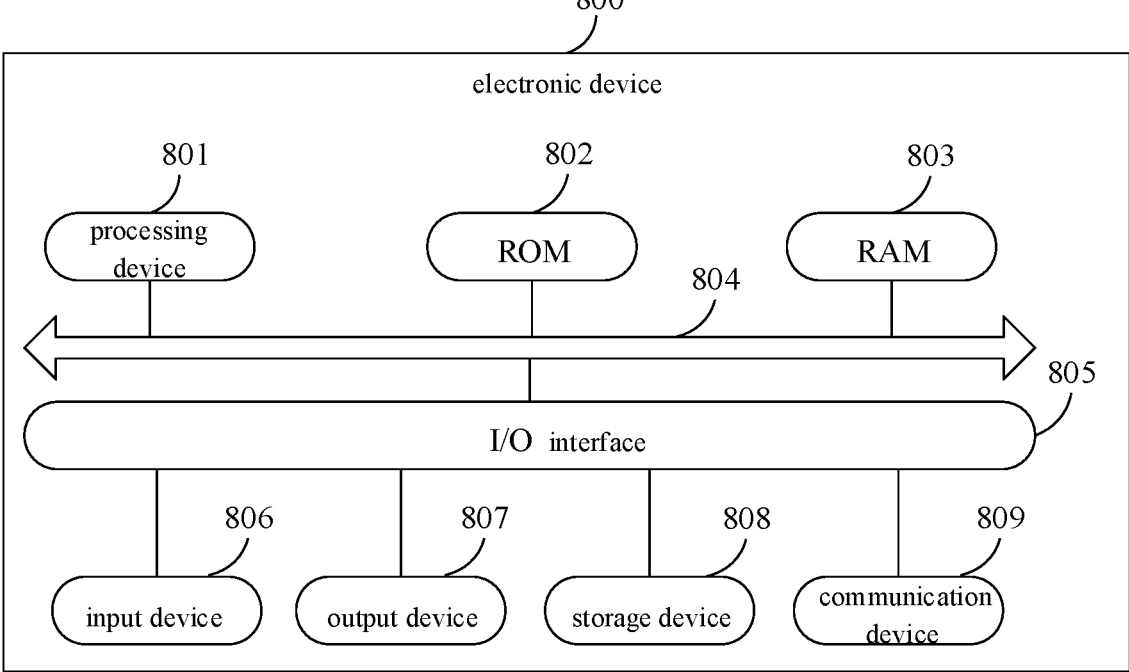
FIG. 8 is a schematic structural diagram illustrating an electronic device provided by an embodiment of the disclosure.

FIG. 8 shows a schematic structural diagram of an electronic device provided by an embodiment of the present disclosure.

As shown in FIG. 8, the electronic device 800 may include a processing device (e.g., a central processing unit, a graphics processor, etc.) 801 that may perform various appropriate actions and processes according to a program stored in a Read Only Memory (ROM) 802 or a program loaded from a storage device 808 into a Random Access Memory (RAM) 803. In the RAM 803, various programs and data necessary for the operation of the information processing apparatus 800 are also stored. The processing device 801, the ROM 802, and the RAM 803 are connected to each other via a bus 804. An input/output interface (I/O interface) 805 is also connected to the bus 804.

Generally, the following devices may be connected to the I/O interface 805: input devices 806 including, for example, a touch screen, touch pad, keyboard, mouse, camera, microphone, accelerometer, gyroscope, or the like; output devices 807 including, for example, a Liquid Crystal Display (LCD), speaker, vibrator, or the like; storage devices 808 including, for example, a magnetic tape, hard disk, etc.; and communication devices 809. The communication device 809 may allow the electronic device 800 to communicate in a wireless or wired manner with other devices to exchange data. While FIG. 8 illustrates an electronic device 800 having various means, it is to be understood that not all illustrated means are required to be implemented or provided. More or fewer means may be alternatively implemented or provided.

It should be noted that the electronic device 800 shown in FIG. 8 is an example, and should not bring any limitation to the functions and the application scope of the embodiments of the present disclosure.

The embodiments of the present disclosure further provide a computer-readable storage medium storing a computer program which, when executed by a processor, causes the processor to implement the reading typesetting method in any embodiment of the present disclosure.

In particular, the processes described above with reference to the flow charts may be implemented as computer software programs, according to embodiments of the present disclosure. For example, embodiments of the present disclosure include a computer program product comprising a computer program carried on a non-transitory computer-readable medium, the computer program containing program code for performing the method illustrated in the flow charts. In such an embodiment, the computer program may be downloaded and installed from a network via the communication device 809, or installed from the storage device 808, or installed from the ROM 802. When executed by the processing device 801, the computer program performs the above-described functions defined in the reading typesetting method according to any of the embodiments of the present disclosure.

It should be noted that the computer-readable medium according to the present disclosure may be a computer-readable signal medium or a computer-readable storage medium or any combination of the two. The computer-readable storage medium may be, for example, but not limited to, an electronic, magnetic, optical, electromagnetic, infrared, or semiconductor system, apparatus, or device, or any combination of the foregoing. More specific examples of the computer-readable storage medium may include, but are not limited to: an electrical connection having one or more wires, a portable computer diskette, a hard disk, a Random Access Memory (RAM), a read-only memory (ROM), an erasable programmable read-only memory (EPROM or flash memory), an optical fiber, a portable compact disc read-only memory (CD-ROM), an optical storage device, a magnetic storage device, or any suitable combination of the foregoing. In the present disclosure, the computer-readable storage medium may be any tangible medium that can contain, or store a program for use by or in connection with an instruction executing system, apparatus, or device. In contrast, in the present disclosure, the computer-readable signal medium may include a data signal included in a baseband or propagated as a part of a carrier, with computer-readable program code embodied therein. Such a propagated data signal may take any of a variety of forms, including, but not limited to, electro-magnetic signals, optical signals, or any suitable combination thereof. The computer-readable signal medium may be any computer-readable medium other than a computer-readable storage medium, which can communicate, propagate, or transport a program for use by or in connection with an instruction executing system, apparatus, or device. Program code embodied on the computer-readable medium may be transmitted using any appropriate medium, including, but not limited to: electrical wires, optical cables, RF (radio frequency), etc., or any suitable combination of the foregoing.

In some embodiments, the clients and servers may communicate using any currently known or future developed network protocol, such as HTTP, and may be communicatively interconnected with digital data (e.g., a communication network) in any form or medium. Examples of communication networks include a local area network ("LAN"), a wide area network ("WAN"), the Internet (e.g., the Internet), and peer-to-peer networks (e.g., ad hoc peer-to-peer networks), as well as any currently known or future developed network.

The computer-readable medium may be embodied in the electronic device; or may be separately present and not incorporated into the electronic device.

The computer-readable medium carries one or more programs which, when executed by the electronic device, cause the electronic device to perform the steps of the reading typesetting method explained in any embodiment of the disclosure.

In an embodiment of the present disclosure, the computer program code for carrying out operations of the present disclosure may be written in one or more programming languages, including, but not limited to, an object oriented programming language, such as Java, Smalltalk, C++, as well as conventional procedural programming languages, such as the "C" programming language or similar programming languages. The program code may be executed entirely on the user's computer, partly on the user's computer, as a stand-alone software package, partly on the user's computer and partly on a remote computer or entirely on a remote computer or server. In a case where a remote computer is involved, the remote computer may be connected to the user's computer through any type of network, including a Local Area Network (LAN) or a Wide Area Network (WAN), or to an external computer (for example, through the Internet using an Internet service provider).

The flow charts and block diagrams in the figures illustrate the architecture, functionality, and operation of possible implementations of apparatuses, methods and computer program products according to various embodiments of the present disclosure. In this regard, each block in the flow charts or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block in the block diagrams and/or flow charts, and combinations of blocks in the block diagrams and/or flow charts, can be implemented by dedicated hardware-based systems that perform the specified functions or operations, or by combinations of the hardware and computer instructions.

The elements described in the embodiments of the present disclosure may be implemented by software or hardware, wherein the name of an element does not in some cases constitute a limitation on the element itself.

The functions described hereinabove may be performed, at least in part, by one or more hardware logic components. For example, without limitation, exemplary types of hardware logic components that may be used include: field Programmable Gate Arrays (FPGAs), Application Specific Integrated Circuits (ASICs), Application Specific Standard Products (ASSPs), systems on a chip (SOCs), Complex Programmable Logic Devices (CPLDs), and the like.

In the context of this disclosure, a machine-readable medium may be a tangible medium that can contain or store a program for use by or in connection with an instruction executing system, apparatus, or device. The machine-readable medium may be a machine-readable signal medium or a machine-readable storage medium. A machine-readable medium may include, but is not limited to, an electronic, magnetic, optical, electromagnetic, infrared, or semiconductor system, apparatus, or device, or any suitable combination of the foregoing. More specific examples of a machine-readable storage medium would include an electrical connection based on one or more wires, a portable computer diskette, a hard disk, a Random Access Memory (RAM), a read-only memory (ROM), an erasable programmable read-only memory (EPROM or flash memory), an optical fiber, a portable compact disc read-only memory (CD-ROM), an optical storage device, a magnetic storage device, or any suitable combination of the foregoing.

The foregoing description is only exemplary illustration of the preferred embodiments of the disclosure and the principles of the technology employed. It will be appreciated by those skilled in the art that the scope of the disclosure herein is not limited to the particular combination of features described above, but also encompasses other combinations of features described above or equivalents thereof without departing from the spirit of the disclosure. For example, the above features and the technical features disclosed in the present disclosure (but not limited to) having similar functions are replaced with each other to form a technical solution.

Further, while operations are depicted in a particular order, this should not be understood as requiring that such operations be performed in the particular order shown or in a sequential order. Under certain circumstances, multitasking and parallel processing may be advantageous. Likewise, while several specific implementation details are included in the above discussion, these should not be construed as limitations on the scope of the disclosure. Certain features that are described in the context of separate embodiments can also be implemented in combination in a single embodiment. Conversely, various features that are described in the context of a single embodiment can also be implemented in multiple embodiments separately or in any suitable subcombination.

Although the subject matter has been described in language specific to structural features and/or methodological acts, it is to be understood that the subject matter defined in the appended claims is not necessarily limited to the specific features or acts described above. Rather, the specific features and acts described above are disclosed only as exemplary forms of implementing the claims.

The invention claimed is:

1. A reading typesetting method, comprising:
receiving an instruction for push information processing;
determining a first typesetting mode of a currently read page based on the instruction for push information processing, wherein the first typesetting mode is used for keeping reading information of the currently read page and determining a first display area and a second display area on the currently read page; and
re-typesetting the currently read page based on the first typesetting mode, and displaying target push information and at least a part of the currently read content in the first display area and the second display area on the re-typeset currently read page respectively, wherein the target push information is obtained by processing original push information based on a processing mode corresponding to the instruction for push information processing,
wherein the target push information is the original push information in a case where the instruction for push information processing comprises an instruction for push information insertion, and
the determining a first typesetting mode of the currently read page based on the instruction for push information processing comprises:
determining the first display area on the currently read page based on a push information insertion position corresponding to the instruction for push information insertion, and
determining other display areas except the first display area on the currently read page as the second display area; and
determining displaying of the original push information and at least a part of the currently read content respectively in the first display area and the second display area as a typesetting position and a typesetting content in the first typesetting mode.

2. The method of claim 1, wherein the determining displaying of the original push information and at least a part of the currently read content respectively in the first display area and the second display area as a typesetting position and a typesetting content in the first typesetting mode comprises:
determining displaying of the original push information and the currently read content respectively in the first display area and the second display area as a typesetting position and a typesetting content in the first typesetting mode;
the determining a first typesetting mode of the currently read page based on the instruction for push information processing further comprises:
determining a first preset adjustment mode as a content typesetting style in the first typesetting mode, wherein the first preset adjustment mode comprises reducing at least one of line spacing, word spacing and word size of the currently read content based on an area size of the second display area.

3. The method of claim 2, wherein the determining a first typesetting mode of the currently read page based on the instruction for push information processing further comprises:
determining an operation of page turning on the currently read page as a typesetting triggering condition in the first typesetting mode.

4. The method of claim 1, wherein the determining displaying of the original push information and at least a part of the currently read content respectively in the first display area and the second display area as a typesetting position and a typesetting content in the first typesetting mode comprises:
if it is determined the first display area covers a first part of read content on the currently read page, removing the first part of read content from the currently read content to update the currently read content, and merging the first part of read content into subsequently read content succeeding the currently read content; and
determining displaying of the original push information and the updated currently read content respectively in the first display area and the second display area as a typesetting position and a typesetting content in the first typesetting mode.

5. The method of claim 1, in a case where the instruction for push information processing comprises an instruction for push information closing, the target push information is empty information;

the determining a first typesetting mode of the currently read page based on the instruction for push information processing comprises:

determining the first display area on the currently read page based on display information of the original push information corresponding to the instruction for push information closing, deleting the first display area, and determining a full screen display area on the currently read page as the second display area; and determining displaying of at least the currently read content in the second display area as a typesetting position and a typesetting content in the first typesetting mode.

6. The method of claim 5, wherein the determining displaying of at least the currently read content in the second display area as a typesetting position and a typesetting content in the first typesetting mode comprises:

based on the display information, sequentially extracting a second part of read content from subsequently read content succeeding the currently read content, and merging the second part of read content into the currently read content to update the currently read content; and determining displaying of updated currently read content in the second display area as a typesetting position and a typesetting content in the first typesetting mode.

7. The method of claim 6, wherein the displaying target push information and at least a part of currently read content in the first display area and the second display area on the re-typeset currently read page respectively comprises:

displaying the currently read content in the second display area of the re-typeset currently read page, and displaying the second part of read content at a preset transparency change rate succeeding the currently read content.

8. The method of claim 5, wherein the determining displaying of at least the currently read content in the second display area as a typesetting position and a typesetting content in the first typesetting mode comprises:

determining displaying of the currently read content in the second display area as a typesetting position and a typesetting content in the first typesetting mode;

the determining a first typesetting mode of the currently read page based on the instruction for push information processing further comprises:

determining a second preset adjustment mode as a content typesetting style in the first typesetting mode, wherein the second preset adjustment mode comprises increasing at least one of line spacing, word spacing and word size of the currently read content based on an area size of the second display area.

9. The method of claim 8, wherein the determining a first typesetting mode for a currently read page based on the instruction for push information processing further comprises:

determining the page turning operation on the currently read page as a typesetting triggering condition in the first typesetting mode.

10. The method of claim 1, subsequent to receiving the instruction for push information processing, the method further comprising:

determining a second typesetting mode of a subsequently read page succeeding the currently read page based on the instruction for push information processing, and re-typesetting the subsequently read page based on the second typesetting mode to generate a re-typeset subsequently read page;

wherein the typesetting position of the second typesetting mode comprises a third display area and a fourth display area determined based on the instruction for push information processing;

the typesetting content of the second typesetting mode comprises the target push information displayed in the third display area and single-page subsequently read content displayed in the fourth display area; and the single-page subsequently read content is read content obtained by re-paging the subsequently read content succeeding the currently read content.

11. The method of claim 1, subsequent to receiving the instruction for push information processing, the method further comprising:

determining a third typesetting mode of a previously read page preceding the currently read page, and re-typesetting the previously read page based on the third typesetting mode to generate a re-typeset previously read page;

wherein the typesetting position of the third typesetting mode comprises a fifth display area and a sixth display area determined based on the instruction for push information processing;

the typesetting content of the third typesetting mode comprises the target push information displayed in the fifth display area and previously read content displayed in the sixth display area;

the previously read content is read content displayed in the previously read page;

the content typesetting style in the third typesetting mode is a third preset adjustment mode; and the third preset adjustment mode is to adjust at least one of line spacing, word spacing and word size of the previously read content according to an adjustment mode corresponding to the instruction for push information processing based on an area size of the sixth display area.

12. The method of claim 1, subsequent to receiving the instruction for push information processing, the method further comprising:

determining whether to perform push information processing on the currently read page based on the instruction for push information processing; and if so, triggering a step of determining the first typesetting mode of the currently read page based on the instruction for push information processing.

13. An electronic device, comprising:

a processor; and a memory for storing executable instructions;

wherein the executable instructions, when executed by the processor, cause the processor to:

receive an instruction for push information processing;

determine a first typesetting mode of a currently read page based on the instruction for push information processing, wherein the first typesetting mode is used for keeping reading information of the currently read page and determining a first display area and a second display area on the currently read page; and re-typeset the currently read page based on the first typesetting mode, and displaying target push information and at least a part of the currently read content in the first display area and the second display area on the re-typeset currently read page respectively, wherein the target push information is obtained by processing origi-
nal push information based on a processing mode
corresponding to the instruction for push information
processing,
wherein the target push information is the original push
information in a case where the instruction for push
information processing comprises an instruction for
push information insertion, and
the instructions for determining a first typesetting mode of
the currently read page based on the instruction for
push information processing cause the processor to:
determine the first display area on the currently read page
based on a push information insertion position corre-
sponding to the instruction for push information inser-
tion, and determine other display areas except the first
display area on the currently read page as the second
display area; and
determine displaying of the original push information and
at least a part of the currently read content respectively
in the first display area and the second display area as
a typesetting position and a typesetting content in the
first typesetting mode.

14. The electronic device of claim 13, wherein the instruc-
tions for determining displaying of the original push infor-
mation and at least a part of the currently read content
respectively in the first display area and the second display
area as a typesetting position and a typesetting content in the
first typesetting mode cause the processor to:
determine displaying of the original push information and
the currently read content respectively in the first
display area and the second display area as a typeset-
ting position and a typesetting content in the first
typesetting mode;
the instructions for determining a first typesetting mode of
the currently read page based on the instruction for
push information processing cause the processor to:
determine a first preset adjustment mode as a content
typesetting style in the first typesetting mode, wherein
the first preset adjustment mode comprises reducing at
least one of line spacing, word spacing and word size
of the currently read content based on an area size of
the second display area.

15. The electronic device of claim 14, wherein the instruc-
tions for determining a first typesetting mode of the cur-
rently read page based on the instruction for push informa-
tion processing cause the processor to:
determine an operation of page turning on the currently
read page as a typesetting triggering condition in the
first typesetting mode.

16. The electronic device of claim 13, wherein the instruc-
tions for determining displaying of the original push infor-
mation and at least a part of the currently read content
respectively in the first display area and the second display
area as a typesetting position and a typesetting content in the
first typesetting mode cause the processor to:
if it is determined the first display area covers a first part
of read content on the currently read page, remove the
first part of read content from the currently read content
to update the currently read content, and merge the first
part of read content into subsequently read content
succeeding the currently read content; and determine displaying of the original push information and
the updated currently read content respectively in the
first display area and the second display area as a
typesetting position and a typesetting content in the first
typesetting mode.

17. The electronic device of claim 13, in a case where the
instruction for push information processing comprises an
instruction for push information closing, the target push
information is empty information;
the instructions for determining a first typesetting mode of
the currently read page based on the instruction for
push information processing cause the processor to:
determine the first display area on the currently read page
based on display information of the original push
information corresponding to the instruction for push
information closing, delete the first display area, and
determine a full screen display area on the currently
read page as the second display area; and
determine displaying of at least the currently read content
in the second display area as a typesetting position and
a typesetting content in the first typesetting mode.

18. A non-transitory computer-readable storage medium
storing a computer program which, when executed by a
processor, causes the processor to:
receive an instruction for push information processing;
determine a first typesetting mode of a currently read page
based on the instruction for push information process-
ing, wherein the first typesetting mode is used for
keeping reading information of the currently read page
and determining a first display area and a second
display area on the currently read page; and
re-typeset the currently read page based on the first
typesetting mode, and displaying target push informa-
tion and at least a part of the currently read content in
the first display area and the second display area on the
re-typeset currently read page respectively, wherein the
target push information is obtained by processing origi-
nal push information based on a processing mode
corresponding to the instruction for push information
processing,
wherein the target push information is the original push
information in a case where the instruction for push
information processing comprises an instruction for
push information insertion, and
the determining a first typesetting mode of the currently
read page based on the instruction for push information
processing comprises:
determining the first display area on the currently read
page based on a push information insertion position
corresponding to the instruction for push information
insertion, and
determining other display areas except the first display
area on the currently read page as the second display
area; and
determining displaying of the original push information
and at least a part of the currently read content respec-
tively in the first display area and the second display
area as a typesetting position and a typesetting content
in the first typesetting mode.

* * * * *